(12) United States Patent
Führer et al.

(10) Patent No.: US 11,945,292 B2
(45) Date of Patent: Apr. 2, 2024

(54) ELECTRIC DRIVE AXLE OF A VEHICLE

(71) Applicant: ZF FRIEDRICHSHAFEN AG, Friedrichshafen (DE)

(72) Inventors: Kim Führer, Lindau (DE); Stephan Demmerer, Wasserburg (DE); Matthias Winkel, Weingarten (DE); Johannes Winkler, Tettnang (DE); Martin Ruider, Schwarzhofen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 414 days.

(21) Appl. No.: 17/289,508

(22) PCT Filed: Oct. 30, 2019

(86) PCT No.: PCT/EP2019/079685
§ 371 (c)(1),
(2) Date: Apr. 28, 2021

(87) PCT Pub. No.: WO2020/089304
PCT Pub. Date: May 7, 2020

(65) Prior Publication Data
US 2021/0394601 A1    Dec. 23, 2021

(30) Foreign Application Priority Data
Oct. 30, 2018    (DE) .................... 10 2018 218 535.2

(51) Int. Cl.
*B60K 1/00*    (2006.01)
*B60K 17/08*    (2006.01)
(Continued)

(52) U.S. Cl.
CPC ................ *B60K 1/00* (2013.01); *B60K 17/08* (2013.01); *B60K 17/16* (2013.01);
(Continued)

(58) Field of Classification Search
CPC .......... B60K 1/00; B60K 17/08; B60K 17/16; F16H 63/3425; F16H 2200/0021
(Continued)

(56) References Cited

U.S. PATENT DOCUMENTS 5,513,719 A * 5/1996 Moroto ................... B60K 6/24
903/952
5,715,901 A 2/1998 Tokushima
(Continued)

FOREIGN PATENT DOCUMENTS

DE 10133695 3/2002
DE 102015119075 5/2016
(Continued)

OTHER PUBLICATIONS

Office Action of corresponding German Patent Application No. 10 2018 218 535.2.

*Primary Examiner* — Ha Dinh Ho
(74) *Attorney, Agent, or Firm* — Cozen O'Connor

(57) ABSTRACT

An electric drive axle of a vehicle with a parking lock and with at least one electric drive with a drive gear of a drive shaft. The drive gear is coupled via at least one intermediate gear of an intermediate shaft to an output gear of a differential gear unit for driving at least one output shaft. For decoupling the electric drive, at least one claw shift element is associated with the drive shaft and/or with the intermediate shaft in such a way that the claw shift element is arranged upstream of the parking lock in power flow direction from electric drive to differential gear unit.

9 Claims, 1 Drawing Sheet

(51) Int. Cl.
*B60K 17/16* (2006.01)
*F16H 63/34* (2006.01)

(52) U.S. Cl.
CPC .... *F16H 63/3425* (2013.01); *B60K 2001/001* (2013.01); *B60Y 2200/91* (2013.01); *F16H 2200/0021* (2013.01)

(58) Field of Classification Search
USPC .......................................................... 74/661
See application file for complete search history.

(56) References Cited

U.S. PATENT DOCUMENTS

| | | | | |
|---|---|---|---|---|
| 6,770,005 | B2 * | 8/2004 | Aikawa | B60K 17/02 |
| | | | | 903/952 |
| 9,822,860 | B2 * | 11/2017 | Kaltenbach | B60K 1/00 |
| 10,363,804 | B2 * | 7/2019 | Yu | H02K 7/11 |
| 10,569,761 | B2 * | 2/2020 | Ikushima | B60K 6/52 |
| 10,933,858 | B2 * | 3/2021 | Ikushima | B60L 50/16 |
| 11,207,962 | B2 * | 12/2021 | Engerman | F16H 37/042 |
| 2016/0003351 | A1 * | 1/2016 | Park | F16H 61/0213 |
| | | | | 475/153 |
| 2019/0301576 | A1 * | 10/2019 | Harada | F16H 37/0813 |
| 2020/0003279 | A1 * | 1/2020 | Hara | B60K 17/02 |

FOREIGN PATENT DOCUMENTS

| | | |
|---|---|---|
| DE | 102015101042 | 7/2016 |
| EP | 2532546 | 12/2012 |
| EP | 2696104 | 2/2014 |

\* cited by examiner

ELECTRIC DRIVE AXLE OF A VEHICLE

CROSS REFERENCE TO RELATED APPLICATIONS

This is a U.S. national stage of Application No. PCT/EP2019/079685 filed Oct. 30, 2019. Priority is claimed on German Application No. DE 10 2018 218 535.2 filed Oct. 30, 2018 the content of which is incorporated herein by reference.

BACKGROUND OF THE INVENTION

1. Field of the Invention

The present disclosure is directed to an electric drive axle of a vehicle with a parking lock and with at least one electric drive.

2. Description of Related Art

An electronic drive module of a vehicle with an electric motor which is known from DE 10 2015 119 075 A1 is coupled to a differential subassembly for driving output shafts of the vehicle via a transmission gearwheel set associated with an intermediate shaft. A clutch mechanism is associated with an intermediate shaft of the transmission gearwheel set in order to decouple the electric motor from the differential subassembly.

If a parking lock for locking the output in the vehicle when the vehicle is stationary is associated with the intermediate shaft, the problem arises that the parking lock cannot block the output when the clutch mechanism at the intermediate shaft is open.

SUMMARY OF THE INVENTION

It is an object of one aspect of the present invention to propose an electric drive axle of the generic type described in the introductory part that enables a decoupling of the electric drive and in which, in addition, the parking lock is operative independent from the decoupling.

Accordingly, an electric drive axle of a vehicle with a parking lock and with at least one electric drive with a drive gear of a drive shaft is suggested, wherein the drive gear is coupled via at least one intermediate gear of an intermediate shaft to an output gear of a differential gear unit for driving at least one output shaft. In order to ensure a decoupling of the output or of the differential gear unit and possibly the functionality of the parking lock independent from the decoupling, it is provided for decoupling the electric drive that at least one claw shift element is associated with the drive shaft and/or with the intermediate shaft in such a way that the claw shift element is arranged upstream of the parking lock in power flow direction from electric drive to differential gear unit.

In this way, the electric drive axle according to one aspect of the invention combines the advantages of decoupling the electric drive in predetermined operating states with the advantages of a parking lock which is operative independent from the state of the claw shift element.

In an electric drive, there are operating points in which the rotor or drive gear must be decoupled from the powertrain, for example, when the vehicle speed is so high that a critical rotor speed is reached, but also in operating states in which the electric motor is neither in engine mode nor in generator mode. In this operating state, drag losses can be reduced by decoupling the drive. The claw shift element should not generate any additional drag losses in the open state. Further, it should be ensured that the parking lock can be effectively closed when the vehicle is stationary. When engaging the parking lock of an automatic transmission, the vehicle and the electric drive are abruptly braked to a standstill via the engaging pawl of the parking lock. The kinetic energy of the vehicle and the rotational energy of the rotor or of the output gear must be decreased within a very short amount of time. These engagement shocks are minimized due to the fact that the claw shift element is located upstream of the parking lock in a power flow direction.

This advantageous arrangement sequence of the claw shift element and parking lock allows the claw shift element to decouple the drive shaft from the intermediate shaft when the claw shift element is in the disconnected or open state and allows the parking lock in the engaged state to fix the intermediate shaft connected to the differential gear unit independent from the claw shift element.

The arrangement sequence suggested according to one aspect of the invention can be implemented in various ways with respect to layout. For example, when the claw shift element is associated with the intermediate shaft, it can be provided that an axially displaceable shifting claw of the claw shift element is arranged coaxial to the intermediate shaft and can be brought into engagement with a driving toothing of the intermediate shaft. In this construction, the shifting claw is connected to the intermediate gear formed as idler gear. In this respect, it is possible that the latter are formed as a common component part or a plurality of interconnected component parts which are formed as idler gears in each instance. In this construction, a parking lock gear of the parking lock is formed as a fixed gear of the intermediate shaft and can be brought into operative connection with the locking pawl of the parking lock. In this way, output can be fixed independent from the electric drive.

When the claw shift element is associated with the drive shaft or motor shaft of the electric drive, for example, it can be provided that the axially displaceable shifting claw of the claw shift element is arranged coaxial to the drive shaft and can be brought into engagement with a driving toothing of the drive shaft. In this construction, the shifting claw is connected to the drive gear formed as idler gear. The parking lock gear of the parking lock in this construction is formed as idler gear of the drive shaft and can be brought into operative connection with a locking pawl of the parking lock, and the intermediate gear is constructed as fixed gear of the intermediate shaft. The output is accordingly also fixable independent from the electric drive in this construction. It is also possible that the parking lock is associated with the intermediate shaft in this construction in order to block the output.

In accordance with an advantageous further development of the invention, it can be provided that a selector fork or the like which is in operative connection with the shifting claw and can be actuated via an electric motor actuator, for example, is provided for the axial actuation of the shifting claw.

In the present invention, the differential gear unit can preferably be constructed as rear axle differential of the vehicle so that the rear wheels of the rear axle of the vehicle drive via the output shafts of the differential gear unit. However, it is also possible to form the differential of the vehicle as front axle differential.

BRIEF DESCRIPTION OF THE DRAWINGS

The present invention will be described more fully in the following referring to the drawings. The drawings show.

DETAILED DESCRIPTION OF THE PRESENTLY PREFERRED EMBODIMENTS

Figure 1:
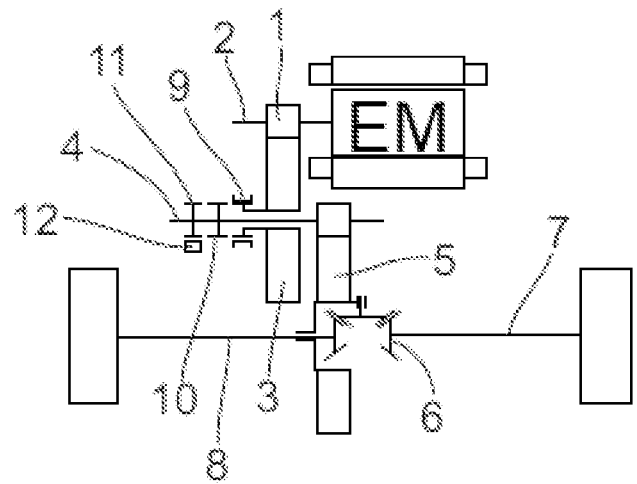
FIG. 1 is a schematic view of an electric drive axle of a vehicle having a claw shift element and a parking lock at an intermediate shaft.
Figure 2:
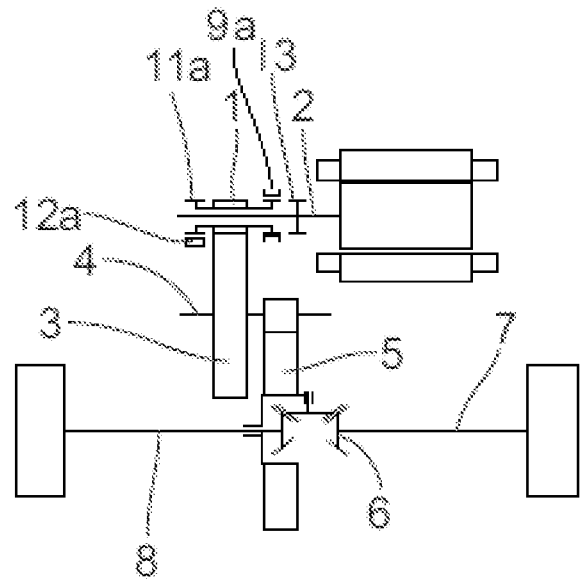
FIG. 2 is a schematic view of the electric drive axle with the claw shift element and the parking lock at a drive shaft.
Figure 3:
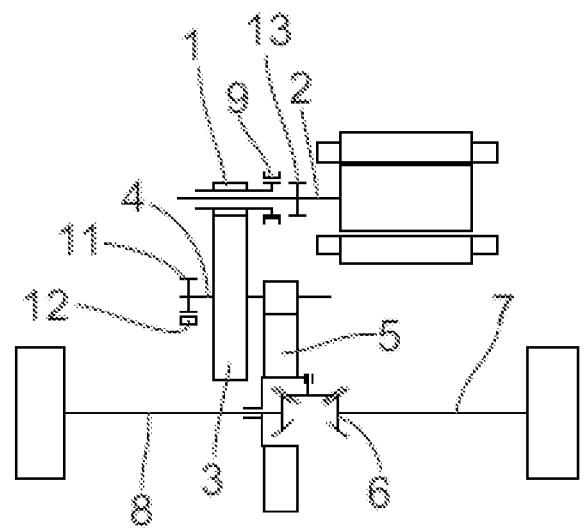
FIG. 3 is a schematic view of the electric drive axle with the parking lock at the intermediate shaft.

FIGS. 1 to 3 show various exemplary constructions of an electric drive axle with a claw shift element for decoupling an electric drive EM and with a parking lock for blocking the output of the vehicle.

The electric drive axle according to one aspect of the invention comprises a parking lock and at least one electric drive EM with a drive gear or rotor 1 of a drive shaft or rotor shaft 2. The electric drive EM is drivable as electric machine in both motor mode and generator mode. The drive gear 1 is coupled, for example, via at least one intermediate gear 3 of an intermediate shaft 4, with an output gear 5, for example, via a two-step cylindrical gear toothing or the like, or is coupled directly with the differential gear unit 6 for driving a first output shaft 7 and a second output shaft 8 which drive rear wheels of a rear axle of the vehicle, for example.

For decoupling the electric drive EM, a claw shift element, for example, is associated with the drive shaft 2 and/or the intermediate shaft 4 in such a way that the claw shift element is arranged before the parking lock in a power flow direction from the electric drive EM to the differential gear unit 6. Consequently, the claw shift element in the disconnected or open state decouples the drive shaft 2 from the intermediate shaft 4, and the parking lock in the engaged state fixes the intermediate shaft 4 connected to the differential gear unit 6 independent from the claw shift element.

In a first constructional variant according to FIG. 1, the claw shift element and the parking lock are both associated with the intermediate shaft 4. To this end, an axially displaceable shifting claw 9 of the claw shift element is arranged coaxial to the intermediate shaft 4 and can be brought into engagement with a driving toothing 10 of the intermediate shaft 4. The shifting claw 9 is connected to the intermediate gear 3 constructed as idler gear. A parking lock gear 11 of the parking lock is constructed as fixed gear of the intermediate shaft 4 and, in order to fix the output or the output shafts 7, 8, can be brought into operative connection with a frame-fixed locking pawl 12 of the parking lock.

Accordingly, the disconnect point in the powertrain of the electric drive axle is accommodated on the intermediate shaft 4. Moderate torques and speeds exist at this location. When the shifting claw 9 is open, there is no drag torque and no losses. Further, the disconnect point or shifting claw 9 can also be closed when the vehicle is stationary.

FIG. 2 shows a second constructional variant in which both the claw shift element and the parking lock are associated with the drive shaft 2. In this regard, the axially displaceable shifting claw 9A of the claw shift element is arranged coaxial to the drive shaft 2 and can be brought into engagement with a driving toothing 13 of the drive shaft 2. The shifting claw 9A is connected to the drive gear 1 formed as idler gear. The parking lock gear 11A of the parking lock is formed as idler gear of the drive shaft 2 and can be brought into operative connection with the locking pawl 12A of the parking lock, the intermediate gear 3 being formed as fixed gear of the intermediate shaft 4.

Accordingly, the disconnect point in the powertrain of the electric drive axle is accommodated on the drive shaft or rotor shaft 2. Therefore, the decoupling is carried out on the drive shaft 2 via the shifting claw 9A. When the shifting claw 9A is open, there is no drag torque and no losses. The torques are lower on the drive shaft 2 than on the intermediate shaft 4. Accordingly, the component part loads are lowest for the components concerned. The latter can accordingly be constructed smaller and lighter in weight. In order to engage the parking lock, the drive gear 1 or drive shaft 2 of the electric drive EM in this construction can be decoupled beforehand. The mass moment of inertia of the drive shaft 2 then no longer has an effect on the parking lock system when the locking pawl 12A engages and therefore need no longer be braked by the latter. Accordingly, the loading of the component parts of the parking lock is appreciably reduced.

FIG. 3 shows a further construction of the second constructional variant according to FIG. 2 in which, in contrast to the construction according to FIG. 2, it is provided that the parking lock gear 11 of the parking lock is constructed as fixed gear of the intermediate shaft 4 and can be brought into operative connection with the locking pawl 12 of the parking lock, the intermediate gear 3 being constructed as fixed gear of the intermediate shaft 4.

The differential gear unit 6 is constructed in all of the constructional variants according to FIGS. 1 to 3 as rear axle differential of the vehicle, for example.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An electric drive axle of a vehicle comprising:
a parking lock;
at least one electric drive;
a drive shaft;
a drive gear of the drive shaft;
an output gear of a differential gear unit for driving at least one output shaft;
at least one intermediate gear of an intermediate shaft that couples the drive gear to the output gear; and
at least one claw shift element that decouples the at least one electric drive is associated with the drive shaft and/or with the intermediate shaft such that the at least one claw shift element is arranged upstream of the parking lock in a power flow direction from electric drive to differential gear unit,
wherein an axially displaceable shifting claw of the at least one claw shift element is arranged coaxial to the drive shaft and can be brought into engagement with a driving toothing of the drive shaft, wherein a parking lock gear of the parking lock is an idler gear of the drive shaft and arranged to be brought into operative connection with a locking pawl of the parking lock, and wherein the at least one intermediate gear is a fixed gear of the intermediate shaft.

2. The electric drive axle according to claim 1, wherein the at least one claw shift element, in a disconnected state, decouples the drive shaft from the intermediate shaft, and the parking lock, in an engaged state, fixes the intermediate shaft connected to the differential gear unit independent from the at least one claw shift element.

3. The electric drive axle according to claim 1, wherein the at least one shifting claw element is connected to the drive gear formed as an idler gear.

4. The electric drive axle according to claim 1, wherein the differential gear unit is constructed as rear axle differential of the vehicle.

5. An electric drive axle of a vehicle comprising:
a parking lock;
at least one electric drive;
a drive shaft;
a drive gear of the drive shaft;
an output gear of a differential gear unit for driving at least one output shaft;
at least one intermediate gear of an intermediate shaft that couples the drive gear to the output gear; and
at least one claw shift element that decouples the at least one electric drive is associated with the drive shaft and/or with the intermediate shaft such that the at least one claw shift element is arranged upstream of the parking lock in a power flow direction from electric drive to differential gear unit, wherein an axially displaceable shifting claw of the at least one claw shift element is arranged coaxial to the intermediate shaft and is arranged to be brought into engagement with a driving toothing of the intermediate shaft.

6. The electric drive axle according to claim 5, wherein the at least one shifting claw is connected to the at least one intermediate gear of the intermediate shaft, and wherein the at least one intermediate gear is an idler gear.

7. The electric drive axle according to claim 5, wherein a parking lock gear of the parking lock is a fixed gear of the intermediate shaft and arranged to be brought into operative connection with a locking pawl of the parking lock.

8. The electric drive axle according to claim 5, wherein a parking lock gear of the parking lock is formed as fixed gear of the intermediate shaft and can be brought into operative connection with a locking pawl of the parking lock, and in that the at least one intermediate gear is constructed as fixed gear of the intermediate shaft.

9. The electric drive axle according to claim 5, further comprising
a selector fork in operative connection with the at least one shifting claw, the selector fork is actuatable via an electric motor actuator is provided for axial actuation of the at least one shifting claw.

* * * * *